US009128725B2

(12) United States Patent  
Meier et al.

(10) Patent No.: US 9,128,725 B2  
(45) Date of Patent: Sep. 8, 2015

(54) LOAD-STORE DEPENDENCY PREDICTOR CONTENT MANAGEMENT

(75) Inventors: Stephan G. Meier, Los Altos, CA (US); John H. Mylius, Gilroy, CA (US); Gerard R. Williams, III, Los Altos, CA (US); Suparn Vats, Fremont, CA (US)

(73) Assignee: Apple Inc., Cupertino, CA (US)

( * ) Notice: Subject to any disclaimer, the term of this patent is extended or adjusted under 35 U.S.C. 154(b) by 671 days.

(21) Appl. No.: 13/464,647

(22) Filed: May 4, 2012

(65) Prior Publication Data

US 2013/0298127 A1 Nov. 7, 2013

(51) Int. Cl.  
G06F 9/312 (2006.01)  
G06F 9/38 (2006.01)

(52) U.S. Cl.  
CPC ............ *G06F 9/3834* (2013.01); *G06F 9/3838* (2013.01); *G06F 9/3842* (2013.01); *G06F 9/3844* (2013.01)

(58) Field of Classification Search  
CPC ... G06F 9/3834; G06F 9/3838; G06F 9/3842; G06F 9/3844  
See application file for complete search history.

(56) References Cited

U.S. PATENT DOCUMENTS

| 4,521,851 | A | 6/1985 | Trubisky et al. |
|---|---|---|---|
| 4,594,660 | A | 6/1986 | Guenthner et al. |
| 4,860,199 | A | 8/1989 | Langendorf et al. |
| 5,276,825 | A | 1/1994 | Blomgren et al. |
| 5,404,470 | A | 4/1995 | Miyake |
| 5,440,752 | A | 8/1995 | Lentz et al. |
| 5,465,336 | A | 11/1995 | Imai et al. |
| 5,467,473 | A | 11/1995 | Kahle et al. |
| 5,471,598 | A | 11/1995 | Quattromani et al. |
| 5,475,823 | A | 12/1995 | Amerson et al. |
| 5,487,156 | A | 1/1996 | Popescu et al. |

(Continued)

FOREIGN PATENT DOCUMENTS

| EP | 0651323 A1 | 5/1995 |
|---|---|---|
| EP | 0651331 A1 | 5/1995 |

(Continued)

OTHER PUBLICATIONS

Tariq Jamil, RAM versus CAM, 1997, IEEE, 0278-6648/97, pp. 26-29, [retrieved on Feb. 5, 2015], retrieved from URL <http://ieeexplore.ieee.org/stamp/stamp.jsp?tp=&arnumber=580445>.*

(Continued)

*Primary Examiner* — Andrew Caldwell  
*Assistant Examiner* — Jyoti Mehta  
(74) *Attorney, Agent, or Firm* — Rory D. Rankin; Meyertons, Hood, Kivlin, Kowert & Goetzel P.C.

(57) ABSTRACT

Methods and apparatuses for managing load-store dependencies in an out-of-order processor. A load store dependency predictor may include a table for storing entries for load-store pairs that have been found to be dependent and execute out of order. Each entry in the table includes a counter to indicate a strength of the dependency prediction. If the counter is above a threshold, a dependency is enforced for the load-store pair. If the counter is below the threshold, the dependency is not enforced for the load-store pair. When a store is dispatched, the table is searched, and any matching entries in the table are armed. If a load is dispatched, matches on an armed entry, and the counter is above the threshold, then the load will wait to issue until the corresponding store issues.

14 Claims, 10 Drawing Sheets

(56) References Cited

U.S. PATENT DOCUMENTS

| | | | |
|---|---|---|---|
| 5,490,259 A | 2/1996 | Hiraoka et al. | |
| 5,557,763 A | 9/1996 | Senter et al. | |
| 5,606,670 A | 2/1997 | Abramson et al. | |
| 5,619,662 A | 4/1997 | Steely, Jr. et al. | |
| 5,625,789 A | 4/1997 | Hesson et al. | |
| 5,625,835 A | 4/1997 | Ebcioglu et al. | |
| 5,651,125 A | 7/1997 | Witt et al. | |
| 5,652,859 A | 7/1997 | Mulla et al. | |
| 5,666,506 A | 9/1997 | Hesson et al. | |
| 5,710,902 A | 1/1998 | Sheaffer et al. | |
| 5,717,883 A | 2/1998 | Sager | |
| 5,742,791 A | 4/1998 | Mahalingaiah et al. | |
| 5,748,978 A | 5/1998 | Narayan et al. | |
| 5,751,983 A | 5/1998 | Abramson et al. | |
| 5,754,812 A | 5/1998 | Favor et al. | |
| 5,761,712 A | 6/1998 | Tran et al. | |
| 5,768,555 A | 6/1998 | Tran et al. | |
| 5,781,752 A | 7/1998 | Moshovos et al. | |
| 5,781,790 A | 7/1998 | Abramson et al. | |
| 5,799,165 A | 8/1998 | Favor et al. | |
| 5,802,588 A | 9/1998 | Ramagopal et al. | |
| 5,822,559 A | 10/1998 | Narayan et al. | |
| 5,832,297 A | 11/1998 | Ramagopal et al. | |
| 5,835,747 A | 11/1998 | Trull | |
| 5,850,533 A | 12/1998 | Panwar et al. | |
| 5,884,060 A | 3/1999 | Vegesna et al. | |
| 5,884,061 A | 3/1999 | Hesson et al. | |
| 5,887,152 A | 3/1999 | Tran | |
| 5,923,862 A | 7/1999 | Nguyen et al. | |
| 5,996,068 A | 11/1999 | Dwyer, III et al. | |
| 6,016,540 A | 1/2000 | Zaidi et al. | |
| 6,021,485 A | 2/2000 | Feiste et al. | |
| 6,108,770 A * | 8/2000 | Chrysos et al. | 712/216 |
| 6,122,727 A | 9/2000 | Witt | |
| 6,141,747 A | 10/2000 | Witt | |
| 6,212,622 B1 | 4/2001 | Witt | |
| 6,212,623 B1 | 4/2001 | Witt | |
| 6,266,744 B1 | 7/2001 | Hughes et al. | |
| 6,393,536 B1 | 5/2002 | Hughes et al. | |
| 6,481,251 B1 | 11/2002 | Meier et al. | |
| 6,502,185 B1 | 12/2002 | Keller et al. | |
| 6,523,109 B1 | 2/2003 | Meier | |
| 6,542,984 B1 | 4/2003 | Keller et al. | |
| 6,571,318 B1 | 5/2003 | Sander et al. | |
| 6,622,237 B1 | 9/2003 | Keller et al. | |
| 6,625,723 B1 | 9/2003 | Jourday et al. | |
| 6,651,161 B1 | 11/2003 | Keller et al. | |
| 6,658,554 B1 | 12/2003 | Moshovos et al. | |
| 6,658,559 B1 | 12/2003 | Arora et al. | |
| 6,678,807 B2 | 1/2004 | Boatright et al. | |
| 6,694,424 B1 * | 2/2004 | Keller et al. | 712/216 |
| 6,728,867 B1 | 4/2004 | Kling | |
| 6,918,030 B2 | 7/2005 | Johnson | |
| 7,062,617 B2 | 6/2006 | Dundas | |
| 7,181,598 B2 | 2/2007 | Jourdan et al. | |
| 7,376,817 B2 | 5/2008 | Kadambi et al. | |
| 7,415,597 B2 | 8/2008 | Filippo et al. | |
| 2002/0178349 A1 | 11/2002 | Shibayama et al. | |
| 2003/0065909 A1 | 4/2003 | Jourdan | |
| 2003/0126409 A1 | 7/2003 | Juan et al. | |
| 2003/0217251 A1 | 11/2003 | Jourdan et al. | |
| 2005/0268075 A1 * | 12/2005 | Caprioli et al. | 712/239 |
| 2006/0095734 A1 * | 5/2006 | Filippo et al. | 712/218 |
| 2006/0248281 A1 | 11/2006 | Al-Sukhni et al. | |
| 2007/0226470 A1 | 9/2007 | Krimer et al. | |
| 2007/0288726 A1 | 12/2007 | Luick | |
| 2008/0183986 A1 * | 7/2008 | Yehia et al. | 711/159 |
| 2009/0083263 A1 | 3/2009 | Felch et al. | |
| 2009/0187727 A1 | 7/2009 | Caprioli et al. | |
| 2010/0205384 A1 | 8/2010 | Beaumont-Smith et al. | |
| 2010/0293347 A1 | 11/2010 | Luttrell | |
| 2010/0325395 A1 | 12/2010 | Burger et al. | |
| 2011/0138149 A1 | 6/2011 | Karlsson et al. | |
| 2011/0143811 A1 | 6/2011 | Rodriguez | |
| 2011/0153986 A1 | 6/2011 | Alexander et al. | |
| 2013/0326198 A1 | 12/2013 | Meier et al. | |

FOREIGN PATENT DOCUMENTS

| | | |
|---|---|---|
| EP | 0709770 A2 | 5/1996 |
| EP | 0727737 A2 | 8/1996 |
| GB | 2281442 A | 3/1995 |
| TW | 200841238 A | 10/2008 |
| TW | 201003516 A | 1/2010 |
| TW | 201033898 A1 | 9/2010 |
| WO | 96/12227 A1 | 4/1996 |
| WO | 97/27538 A1 | 7/1997 |
| WO | 01/50252 | 7/2001 |
| WO | 2006/028555 | 3/2006 |

OTHER PUBLICATIONS

John Kubiatowicz, Reorder Buffers and Explicit Register Renaming, Sep. 22, 2000, 55 pages, [retrieved on Feb. 5, 2015], retrived from URL <http://www.cs.berkeley.edu/~kubitron/courses/cs252-F00/lectures/lec07-renamereorder.ppt>.*

Communication pursuant to Article 94(3) EPC in European Application No. 13165284.4, mailed Jul. 23, 2014, 6 pages.

Notice of Preliminary Rejection in Korean Patent Application No. 10-2013-49975, mailed Jul. 23, 2014, 11 pages.

Jaleel et al., "Using Virtual Load/Store Queues (VLSQs) to Reduce the Negative Effects of Reordered Memory Instructions", In the Proceedings of the 11th International Symposium on High-Performance Computer Architecture, Feb. 2005, 10 pages, IEEE Computer Society, Washington, DC, USA.

Leibholz, et al., "The Alpha 21264: A 500 MHz Out-of Order Execution Microprocessor", Feb. 1997, IEEE, pp. 28-36, IEEE Computer Society Press, Los Alamitos, CA, USA.

Popescu et al., "The Metaflow Architecture", IEEE Micro, Jun. 1991, pp. 10-13 and 63-73, IEEE Computer Society Press, Los Alamitos, CA, USA.

Moshovos et al., "Speculative Memory Cloaking and Bypassing", International Journal of Parallel Programming, Dec. 1999, 15 pages, Kluwer Academic Publishers, Norwell, MA, USA.

Moshovos et al., "Streamlining Inter-operation Memory Communication via Data Dependence Prediction", In Proceedings of the 30th International Symposium on Microarchitecture, Dec. 1997, 11 pages, IEEE Computer Society, Washington, DC, USA.

Gopal et al., "Speculative Versioning Cache", In Proceedings of the 4th International Symposium on High-Performance Computer Architecture, Jan. 1998, 11 pages, IEEE Computer Society, Washington, DC, USA.

Chrysos et al., "Memory Dependence Prediction Using Store Sets", Proceedings of the 25th Annual International Symposium on Computer Architecture, Apr. 16, 1998, 12 pages, IEEE Computer Society, Washington, DC, USA.

Moshovos et al., "Dynamic Speculation and Synchronization of Data Dependences", Proceedings of the 24th Annual International Symposium on Computer Architecture, Jun. 1, 1997, 13 pages, ACM, New York, NY, USA.

Johnson, Mike, "Superscalar Microprocessor Design", 1991, pp. 127-129, Prentice-Hall, Inc., Englewood Cliffs, NJ, USA.

Gwennap, Linley, "Digital 21264 Sets New Standard: Clock Speed, Complexity, Performance Surpass Records, But Still a Year Away", Microdesign Resources, Oct. 28, 1996, 6 pages, vol. 10, No. 14.

Reinman, et al. "Predictive Techniques for Aggressive Load Speculation", In the Proceedings of the Annual 31st International Symposium on Microarchitecture, Dec. 1998, pp. 127-137, IEEE Computer Society Press, Los Alamitos, CA, USA.

International Search Report and Written Opinion in application No. PCT/US2013/041852 mailed Sep. 30, 2013 pp. 1-14.

Office Action in Taiwan Patent Application No. 102115961, mailed Nov. 20, 2014, 23 pages.

Office Action in Japanese Patent Application No. 2013-096795, mailed Aug. 18, 2014, 27 pages.

(56) References Cited

OTHER PUBLICATIONS

Extended Search Report in EP Application No. 13165284.4-1957, International Search Report and Written Opinion in application No. PCT/US2013/037809 mailed Sep. 10, 2013 pp. 1-16. Sep. 30, 2013, pp. 1-9.

Notice of Last Preliminary Rejection in Korean Patent Application No. 10-2013-49975, mailed Feb. 9, 2015, 4 pages.

Office Action in Taiwan Patent Application No. 102119009, mailed Feb. 13, 2015, 6 pages.

Final Office Action in Japanese Patent Application No. 2013-096795, mailed Mar. 4, 2015, 19 pages.

Non-Final Office Action in U.S. Appl. No. 13/483,268, mailed Feb. 23, 2015, 28 pages.

Jacob, Bruce, "The RiSC-16 Instruction-Set Architecture", 2000, 4 pages, [retrieved on Jan. 30, 2015], retrieved from URL <http://www.eng.umd.edu/~blj/RiSC/RiSC-isa.pdf>.

Dynamic Scheduling, Jul. 13, 2010, 11 pages, [retrieved on Jan. 30, 2015], retrieved from URL <http://www.ece.unm.edu/~jimp/611/slides/chap4_4.html>.

"ARM Compiler toolchain: Using the Assembler", 2011, ARM, 4 pages, [retrieved on Jan. 30, 2015], retrieved from URL <http://infocenterarm.com/help/index.jsp?topic=/com.arm.doc.dui0473c/CEGCCADE.html>.

Notification of the First Office Action in Chinese Application No. 201310323392.0, mailed May 4, 2015, 33 pages.

Final Office Action in U.S. Appl. No. 13/483,268, mailed Jun. 15, 2015, 12 pages.

\* cited by examiner

| | | | | | |
|---|---|---|---|---|---|
| Valid | Store PC | Store RNUM | Armed | Load PC | Counter |
| 92 | 94 | 96 | 98 | 100 | 102 |

LSD Predictor Table 90

FIG. 4

Table 110

| Counter Value | Mode |
|---|---|
| 11 | Strongly Enabled |
| 10 | Weakly Enabled |
| 01 | Weakly Disabled |
| 00 | Strongly Disabled |

FIG. 5

LOAD-STORE DEPENDENCY PREDICTOR CONTENT MANAGEMENT

BACKGROUND

1. Field of the Invention

The present invention relates generally to processors, and in particular to methods and mechanisms for managing load-store dependencies in processors.

2. Description of the Related Art

Superscalar processors attempt to achieve high performance by issuing and executing multiple instructions per clock cycle and by employing the highest possible clock frequency consistent with the design. One way to increase the number of instructions executed per clock cycle is by performing out of order execution. In out of order execution, instructions may be executed in a different order than that specified in the program sequence (or "program order").

Some processors may be as aggressive as possible in scheduling instructions out of order and/or speculatively in an attempt to maximize the performance gain realized. For example, it may be desirable to schedule load memory operations prior to older store memory operations, since load memory operations more typically have dependent instructions. However, in some cases, a load memory operation may depend on an older store memory operation (e.g., the store memory operation updates at least one byte accessed by the load memory operation). In such cases, the load memory operation is incorrectly executed if executed prior to the store memory operation. If a load memory operation is executed prior to an older store memory operation on which the load depends, the processor may need to be flushed and redirected, which will degrade processor performance.

An operation is older than another operation if the operation is prior to the other operation in program order. An operation is younger than another operation if it is subsequent to the other operation in program order. Similarly, operations may be indicated as being prior to or subsequent to other operations, or may be referred to as previous operations, preceding operations, subsequent operations, etc. Such references may refer to the program order of the operations. Furthermore, a "load memory operation" or "load operation" may refer to a transfer of data from memory or cache to a processor, and a "store memory operation" or "store operation" may refer to a transfer of data from a processor to a memory or cache. "Load operations" and "store operations" may be more succinctly referred to herein as "loads" and "stores", respectively.

While dependencies between loads and stores are dynamic, mechanisms to prevent these events are typically static in nature. Therefore, in an effort to prevent an out of order violation for a load-store pair, the processor is more likely to overcompensate and not aggressively schedule out-of-order. In this case, the processor will force instructions to be in order unnecessarily. If a dependency is no longer required but is nevertheless enforced, then the memory level parallelism will be reduced and processor efficiency decreased.

SUMMARY

Systems, apparatuses, processors, and methods for predicting load-store dependencies are contemplated. A processor may include at least a dispatch unit, load-store dependency predictor, and a reservation station. When an ordering violation between a younger load and an older store on which the load depends is detected, this constitutes a training event for the load-store dependency predictor. After the load-store pair has been trained, the predictor may add a dependency to the load the next time the load comes through the dispatch unit. This added dependency indicates the load should not be scheduled out of the reservation station until the store has been scheduled.

In one embodiment, a predictor table may be utilized to store load-store pairs that have been found to be dependent. When a younger load issues in front of an older store that shares an address dependency, an entry may be allocated in the predictor table, and in one embodiment, the entry may be associated with at least a portion of a store program counter (PC) for the store and at least a portion of a load PC value for the dependent load. Each entry in the predictor table may also include a counter field, and the counter field may represent the strength of the data dependency prediction for that particular load-store pair. The counter field allows predicted dependencies to be turned off when they are stale or no longer valid.

The value of the counter field may also affect the replacement policy for the predictor table. A replacement pointer may be constantly scanning the entries of the predictor and looking for entries with low counter values. In one embodiment, each time the predictor table is accessed, the replacement pointer may advance. When the replacement pointer finds an entry with a counter value of zero, then the pointer may stop at this entry. When a new entry is allocated for a new dependent load-store pair, then the existing entry with the counter equal to zero indicated by the pointer may be utilized for the new entry.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 4 illustrates one embodiment of a load-store dependency predictor table.

FIG. 5 is a block diagram that illustrates one embodiment of the representation of counter values utilized in a load-store dependency predictor table.

DETAILED DESCRIPTION OF EMBODIMENTS

Figure 1:
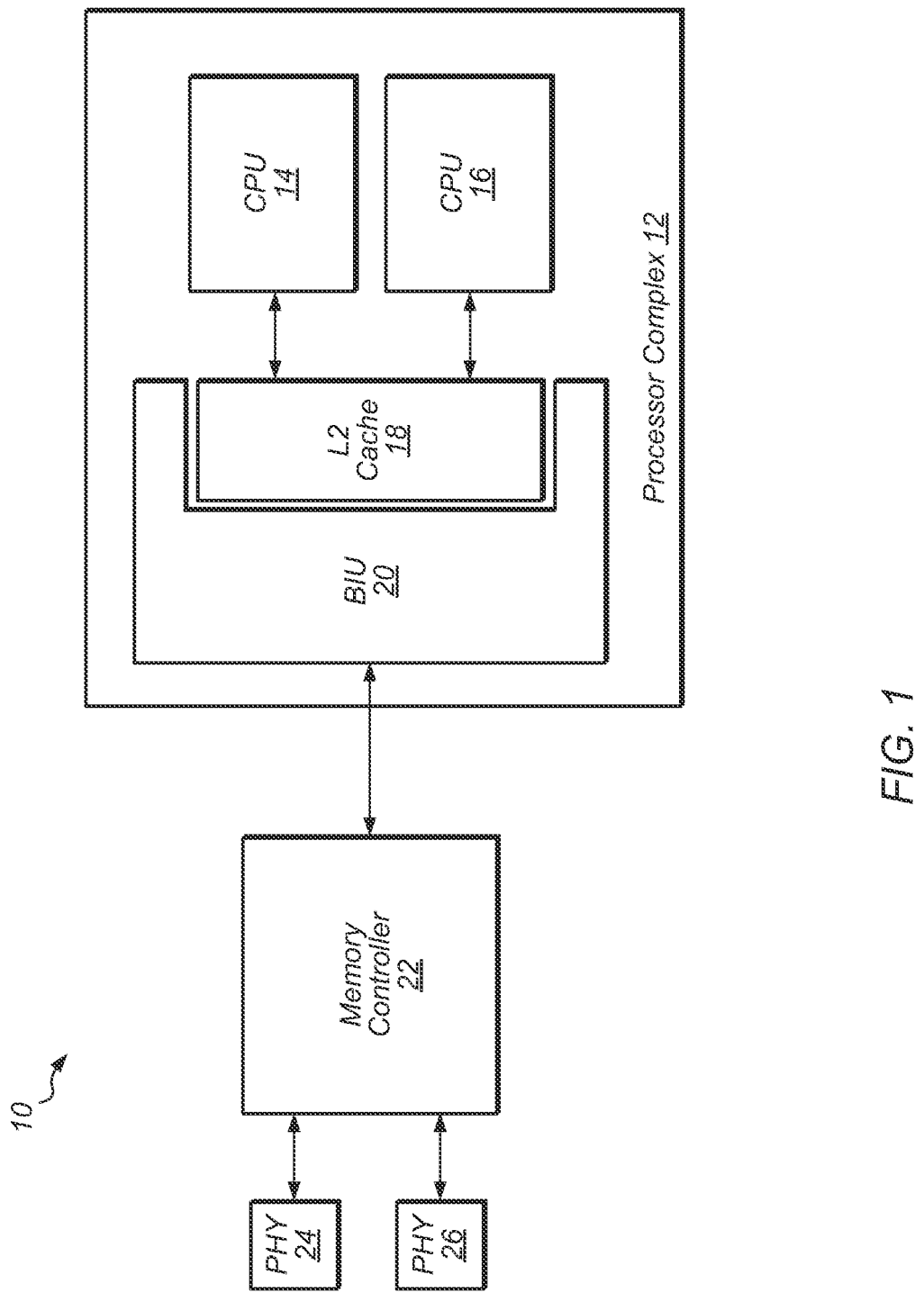
FIG. 1 illustrates one embodiment of a portion of an integrated circuit.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a load-store dependency predictor . . . ." Such a claim does not foreclose the processor from including additional components (e.g., a cache, a fetch unit, an execution unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an integrated circuit (IC) is shown. In the illustrated embodiment, IC 10 includes a processor complex 12, memory controller 22, and memory physical interface circuits (PHYs) 24 and 26. It is noted that IC 10 may also include many other components not shown in FIG. 1. In various embodiments, IC 10 may also be referred to as a system on chip (SoC), an application specific integrated circuit (ASIC), or an apparatus.

Processor complex 12 may include central processing units (CPUs) 14 and 16, level two (L2) cache 18, and bus interface unit (BIU) 20. In other embodiments, processor complex 12 may include other numbers of CPUs. CPUs 14 and 16 may also be referred to as processors or cores. CPUs 14 and 16 may be coupled to L2 cache 18. L2 cache 18 may be coupled to BIU 20, which may be coupled to memory controller 22. Other embodiments may include additional levels of cache (e.g., level three (L3) cache). It is noted that processor complex 12 may include other components not shown in FIG. 1.

The CPUs 14 and 16 may include circuitry to execute instructions defined in an instruction set architecture. Specifically, one or more programs comprising the instructions may be executed by the CPUs 14 and 16. Any instruction set architecture may be implemented in various embodiments. For example, in one embodiment, the PowerPC™ instruction set architecture may be implemented. Other exemplary instruction set architectures may include the ARM™ instruction set, the MIPS™ instruction set, the SPARC™ instruction set, the x86 instruction set (also referred to as IA-32), the IA-64 instruction set, etc.

In various embodiments, CPUs 14 and 16 may execute instructions out-of-order, which in some cases may cause ordering violations. For example, in the case of load and store instructions, ordering violations may occur when younger loads execute before older stores with overlapping physical addresses. To avoid or to prevent a repetition of this type of ordering violation, various techniques may be employed to prevent a younger load from being executed prior to an older store upon which it is dependent. In one embodiment, each of CPUs 14 and 16 may include a load-store dependency predictor for keeping track of load-store pairs which are predicted or expected to be dependent and which may also have a tendency to execute out of order. In one embodiment, dependent load-store pairs may be recorded in a table.

Sometimes the predictor may train on a load-store pair, but the dependency may be an exceptional case. This may occur because the dependency between the load and store instructions may be based on an address, and the addresses of the load and store instruction may change over time. In other words, the load-store dependencies may be dynamic. Some of the entries in the table may not be accurate after a period of time, and enforcing dependencies for inaccurate entries may cause the processor to unnecessarily delay load operations without any benefits.

To prevent stale entries from accumulating in the table, and to prevent dependencies from being enforced for load-store pairs corresponding to stale entries, each entry of the table may also include an indicator representing the strength of the dependency prediction. The indicator may determine whether a dependency is enforced for a given load-store pair. The indicator may also affect the replacement policy for table entries, such that entries with low indicator values may be replaced when a new entry is allocated in the table.

Each of CPUs 14 and 16 may also include a level one (L1) cache (not shown), and each L1 cache may be coupled to L2 cache 18. In one embodiment, L2 cache 18 may be configured to cache instructions and data for low latency access by CPUs 14 and 16. The L2 cache 18 may comprise any capacity and configuration (e.g. direct mapped, set associative). L2 cache 18 may be coupled to memory controller 22 via BIU 20. BIU 20 may also include various other logic structures to couple CPUs 14 and 16 and L2 cache 18 to various other devices and blocks.

Memory controller 22 may include any number of memory ports and may include circuitry configured to interface to memory. For example, memory controller 22 may be configured to interface to dynamic random access memory (DRAM) such as synchronous DRAM (SDRAM), double data rate (DDR) SDRAM, DDR2 SDRAM, Rambus DRAM (RDRAM), etc. Memory controller 22 may also be coupled to memory physical interface circuits (PHYs) 24 and 26. Memory PHYs 24 and 26 are representative of any number of memory PHYs which may be coupled to memory controller 22. The memory PHYs 24 and 26 may be configured to interface to memory devices (not shown).

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
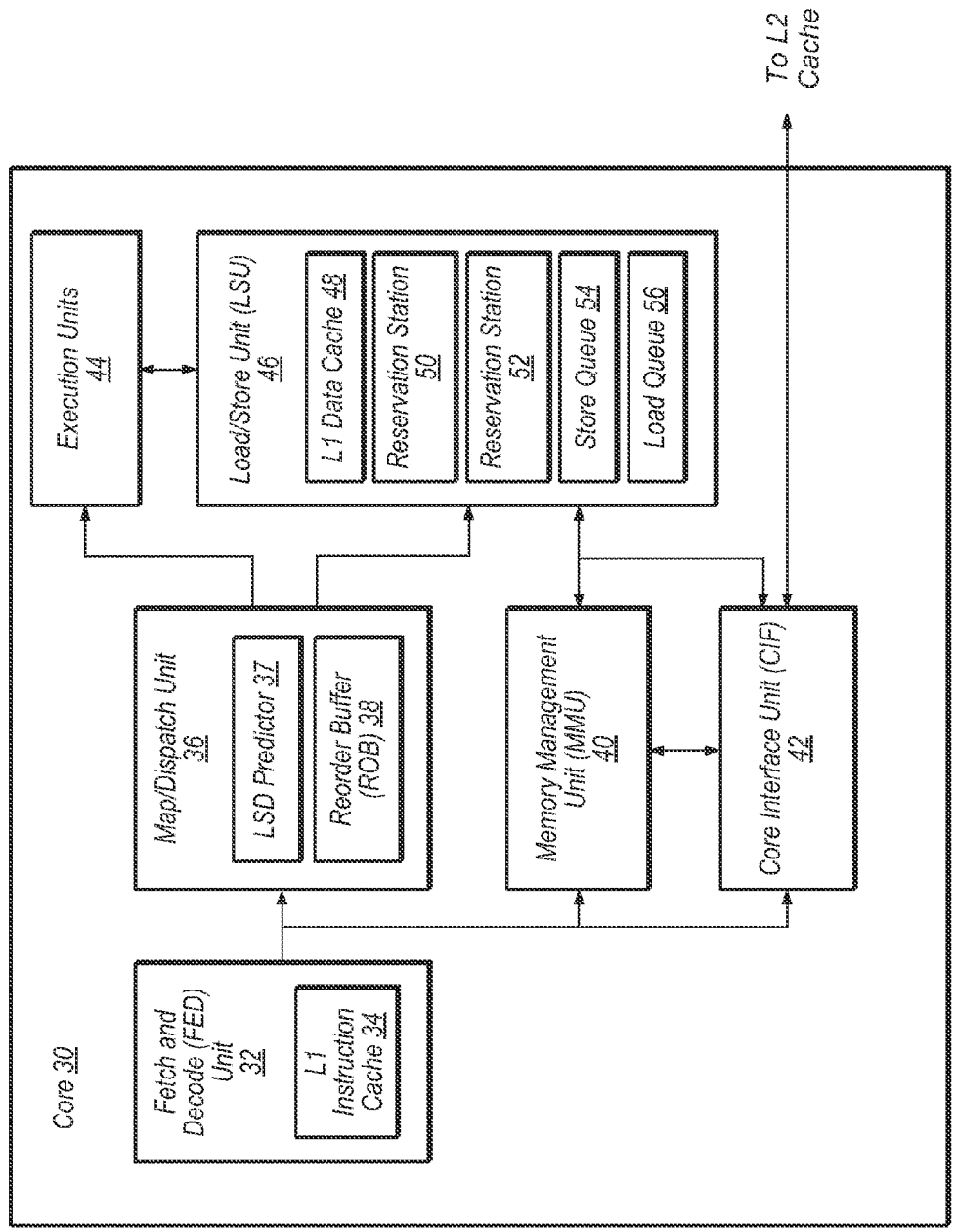
FIG. 2 is a block diagram that illustrates one embodiment of a processor core.

Turning now to FIG. 2, one embodiment of a processor core is shown. Core 30 is one example of a processor core, and core 30 may be utilized within a processor complex, such as processor complex 12 of FIG. 1. In one embodiment, each of CPUs 14 and 16 of FIG. 1 may include the components and functionality of core 30. Core 30 may include fetch and decode (FED) unit 32, map and dispatch unit 36, memory management unit (MMU) 40, core interface unit (CIF) 42, execution units 44, and load-store unit (LSU) 46. It is noted that core 30 may include other components and interfaces not shown in FIG. 2.

FED unit 32 may include circuitry configured to read instructions from memory and place them in level one (L1) instruction cache 34. L1 instruction cache 34 may be a cache memory for storing instructions to be executed by core 30. L1 instruction cache 34 may have any capacity and construction (e.g. direct mapped, set associative, fully associative, etc.). Furthermore, L1 instruction cache 34 may have any cache line size. FED unit 32 may also include branch prediction hardware configured to predict branch instructions and to fetch down the predicted path. FED unit 32 may also be redirected (e.g. via misprediction, exception, interrupt, flush, etc.).

FED unit 32 may also be configured to decode the instructions into instruction operations (ops). Generally, an instruction operation may be an operation that the hardware included in execution units 44 and LSU 46 is capable of executing. Each instruction may translate to one or more instruction operations which, when executed, result in the performance of the operations defined for that instruction according to the instruction set architecture. FED unit 32 may be configured to decode multiple instructions in parallel.

In some embodiments, each instruction may decode into a single instruction operation. FED unit 32 may be configured to identify the type of instruction, source operands, etc., and each decoded instruction operation may comprise the instruction along with some of the decode information. In other embodiments in which each instruction translates to a single op, each op may simply be the corresponding instruction or a portion thereof (e.g., the opcode field or fields of the instruction). In some embodiments, the FED unit 32 may include any combination of circuitry and/or microcode for generating ops for instructions. For example, relatively simple op generations (e.g., one or two ops per instruction) may be handled in hardware while more extensive op generations (e.g., more than three ops for an instruction) may be handled in microcode. In other embodiments, the functionality included within FED unit 32 may be split into two or more separate units, such as a fetch unit, a decode unit, and/or other units.

Decoded ops may be provided to map/dispatch unit 36. Map/dispatch unit 36 may be configured to map ops and architectural registers to physical registers of core 30. Map/dispatch unit 36 may implement register renaming to map source register addresses from the ops to the source operand numbers identifying the renamed source registers. Map/dispatch unit 36 may also be configured to dispatch ops to reservation stations within execution units 44 and LSU 46. Map/dispatch unit 36 may include load-store dependency (LSD) predictor 37 and reorder buffer (ROB) 38. Prior to being dispatched, the ops may be written to ROB 38. ROB 38 may be configured to hold ops until they can be committed in order. Each op may be assigned a ROB index (RNUM) corresponding to a specific entry in ROB 38. RNUMs may be used to keep track of the operations in flight in core 30. Map/dispatch unit 36 may also include other components (e.g., mapper array, dispatch unit, dispatch buffer) not shown in FIG. 2. Furthermore, in other embodiments, the functionality included within map/dispatch unit 36 may be split into two or more separate units, such as a map unit, a dispatch unit, and/or other units.

LSD predictor 37 may be configured to train on and predict dependent load-store instruction pairs that are likely to issue out-of-order. LSD predictor 37 may include a table with entries for the load-store pairs that have been trained, and each entry may include information identifying the load and store instructions and the strength of the prediction. In one embodiment, a training event may be an ordering violation triggered by the execution of a younger load before an older store with overlapping physical addresses. In one embodiment, the table may be a 256-entry fully associative structure. In other embodiments, the table may have other numbers of entries. In various embodiments, the table may be a content-addressable memory (CAM) for various fields of the table.

When there is an order violation between dependent load and store operations, core 30 may be redirected and resynced. Various corrective actions may be taken as a result of a redirect. At this point, training may be performed for the particular load-store pair that caused the resync. An entry for this particular pair may be allocated in LSD predictor 37, and the strength of the prediction may be set to a high level. Then, on a next pass through the pipeline of core 30, when the store from the load-store pair is dispatched from unit 36, LSD predictor 37 may be searched for the store. The matching entry may be found and armed. When the load from the trained load-store pair is dispatched from unit 36, a search of LSD predictor 37 may be performed for the load, and the load will match on the armed entry. Then, the load may be dispatched to a reservation station with a dependency, causing the load to wait on the store before issuing from the reservation station.

LSD predictor 37 may be configured to clean up the table if a store that armed an entry is flushed from the instruction pipeline prior to the store being issued. For example, there may be a scenario when there is a need to disarm an armed entry of LSD predictor 37, such as when there is a fault. A load operation could be dependent and waiting on a store operation that has since been flushed out, and this could end up deadlocking core 30. In this case, when a store operation is flushed from core 30, the table of LSD predictor 37 may be searched for any armed entries corresponding to the flushed store. Any matching entries that are found for the flushed store may be disarmed. In one embodiment, each entry of LSD predictor 37 may include a store RNUM to identify the specific store of the load-store pair.

Execution units 44 may include any number and type of execution units (e.g., integer, floating point, vector). Each of execution units 44 may also include one or more reservation stations (not shown). CIF 42 may be coupled to LSU 46, FED unit 32, MMU 40, and an L2 cache (not shown). CIF 42 may be configured to manage the interface between core 30 and the L2 cache. MMU 40 may be configured to perform address translation and memory management functions.

LSU 46 may include L1 data cache 48, reservation stations 50 and 52, store queue 54, and load queue 56. Load and store operations may be dispatched from map/dispatch unit 36 to reservation stations 50 and 52. Other embodiments may include other numbers of reservation stations. Operations may issue out of reservation stations 50 and 52 out-of-order. Store queue 54 may store data corresponding to store operations, and load queue 56 may store data associated with load operations. LSU 46 may also be coupled to the L2 cache via CIF 42. It is noted that LSU 46 may also include other components (e.g., register file, prefetch unit, translation lookaside buffer) not shown in FIG. 2.

A load-store order violation may be detected by LSU 46 at the time the older store is issued. In one embodiment, the store address of the older store may be compared against all younger loads in load queue 56. If a match is detected, then the load operation may have already completed with the incorrect data. This may be corrected in the future by signaling a redirect back to map/dispatch unit 36 using the RNUMs of the load and store operations. Map/dispatch unit 36 may flush the instructions from core 30 pipeline and redirect the front-end of core 30 back to the instruction address of the load, and the load instruction may be refetched. To prevent future redirects, map/dispatch unit 36 may predict and record dependencies for loads on stores in LSD predictor 37 and communicate the predicted dependencies to reservation stations 50 and 52.

In a typical case, when a store is dispatched, the store may search LSD predictor 37, and then if a match is found for the store, then the matching entry in the table may be armed (i.e., activated), and the store RNUM may be written to the entry. Subsequently, the load may be dispatched, and a search across loads in the table may be performed. In one embodiment, the identifying values used for searching LSD predictor 37 may be at least a portion of the load and store PC values. In another embodiment, the identifying values used for searching and stored in the entries may be hashed values derived from at least a portion of the PC values, at least a portion of the architectural register values, and/or at least a portion of the micro-op values. Other possibilities of identifiers which may be utilized are possible and are contemplated.

In various embodiments, the load may match on any number of entries in LSD predictor 37. In one embodiment, for a match to occur the entry needs to be armed. If the load matches on one armed entry, then a dependency to the store RNUM may be created by linking the armed store RNUM to the load. The load may be marked as waiting for that particular store RNUM to issue from a reservation station. In the reservation stations, there may be a dependency field for loads, and the load may be marked as dependent on a given store to issue from one of the reservation stations 50 or 52. So in this case, the load may be marked as waiting for a specific store RNUM, and the load may issue one cycle after the specific store issues.

If the load matches on multiple armed store entries, this may be referred to as a multimatch case. In this case, the load may wait until all older stores have issued before issuing. For example, in one embodiment, a bit may be set so that the load may wait for all older stores to issue before the load issues. This will force all older stores to issue from reservation stations 50 and 52 ahead of the load. In one embodiment, each of reservation stations 50 and 52 may make available the oldest store it contains. Once the load becomes older than both of those stores, then the load may issue.

Each reservation station 50 and 52 may include a picker that is configured to issue any operations that are valid. When a store becomes valid, and it gets picked and issued, a tag may be broadcast, and then the load, which is dependent on this store, will match on that tag. This will mark the load as eligible to be issued out of the reservation station. In other words, the store produces a tag that is consumed by the load. In one embodiment, the tag may be the RNUM of the store. In one embodiment, the RNUM may be a 9-bit value, although in other embodiments, the size of the RNUM may vary. A load with a dependency may have an extra source stored with the load in the reservation station, and that extra source may be the RNUM of the store from the same entry in LSD predictor 37.

When a load matches on an entry in LSD predictor 37 and the entry is armed, this signifies there is a valid store which the load needs to wait on. The entry may also include an indicator as to the strength of the prediction. In one embodiment, the indicator may be a counter, and if the value of the counter is above a threshold, then the entry may be considered a strong, highly likely prediction and the load-store dependency may be established. The value of the threshold may vary from embodiment to embodiment. If the load matches on an armed entry and the indicator is weak, indicating not to use the prediction, then a dependency may not be established for the load. If the load-store dependency is established, then the load may pick up the RNUM of the store, such that the RNUM gets read out of the entry and passed along to the reservation station with the load when the load is dispatched. The load may also be marked as having a dependency in the reservation station.

In one embodiment, a store issuing from a reservation station will cause a tag to be broadcast only if a store is marked as being a valid producer. When a store searches LSD predictor 37 and a match is not found, then the store will not be setup as a valid producer. If the store finds a valid entry in LSD predictor 37, and the prediction strength indicator denotes that the load-store pair dependency prediction is above a threshold (i.e., the prediction is turned on), then the entry may be armed. In one embodiment, if the prediction strength indicator is below a threshold, then the store will not arm the entry, even though the store matches with that store entry. In some embodiments, the entry may be armed when the store finds a match regardless of the value of the prediction strength indicator. The store may match on multiple entries, and multiple entries may be armed for a single store.

When a load matches on an armed entry of LSD predictor 37, the load is marked as dependent, and the load may wait to issue from the reservation station until the corresponding store issues from the reservation station. Then, after the load with an established dependency issues, it may be determined from where the load receives its data. Depending on where the load receives its data, the prediction strength indicator in the corresponding entry of LSD predictor 37 may be increased, decreased, or left the same.

For example, if the load data was forwarded from store queue 54, then the prediction from LSD predictor 37 may be considered good. In this case, the data from the store had not yet made it to cache 48, and so it was beneficial that the load waited for the store. If the load data for this load operation is still in store queue 54, then this may indicate that there really is a true dependency between the load and the store. In other words, the data did need to be forwarded from store queue 54 for the dependent load.

If there is a miss in store queue 54 for the load data, then the dependency may no longer be valid. It is possible that there was a prior dependency, but then the address of the load or the store changed, and the load and store no longer collide. In this case, if the store data is retrieved from cache 48, then the data may have been stored there for a long time. Therefore, determining whether the store data was forwarded from store queue 54 or from cache 48 may indicate whether the prediction was accurate or not. Furthermore, the prediction strength indicator stored in the matching entry of LSD predictor 37 may be updated based on this determination. If the prediction was accurate, such that the load data is forwarded from store queue 54, then the prediction strength indicator may be increased. If the load data comes from cache 48, then the prediction strength indicator may be decreased. In other embodiments, other techniques for determining if the dependency prediction was accurate may be utilized.

It should be understood that the distribution of functionality illustrated in FIG. 2 is not the only possible microarchitecture which may be utilized for a processor core. Other processor cores may include other components, omit one or more of the components shown, and/or include a different arrangement of functionality among the components.

Figure 3:
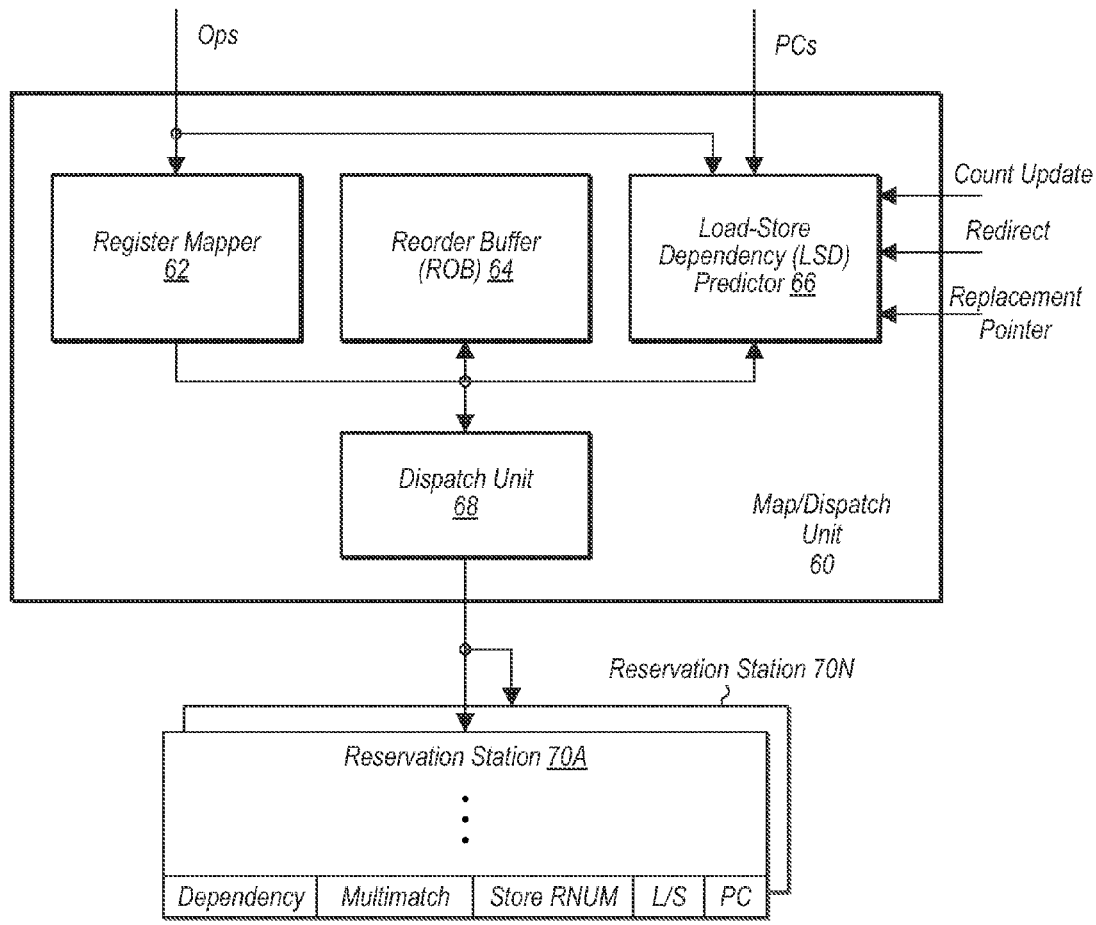
FIG. 3 is a block diagram illustrating one embodiment of a map/dispatch unit and a reservation station.

Referring now to FIG. 3, a block diagram of one embodiment of a map/dispatch unit and a reservation station is shown. In one embodiment, map/dispatch unit 60 may include a register mapper 62, a reorder buffer (ROB) 64, a load store dependency (LSD) predictor 66, and a dispatch unit 68. The register mapper 62 and LSD predictor 66 are coupled to receive ops from a decode unit (not shown). LSD predictor 66 is coupled to receive PCs from the decode unit and is coupled to receive the "Redirect" and "Count Update" signals from a load-store unit (not shown). LSD predictor 66 is also coupled to a replacement pointer which searches LSD predictor 66 for entries that can be discarded when a new entry is allocated.

Register mapper 62 may be configured to map architectural registers to physical registers, and to provide ops and physical register addresses to dispatch unit 68. Dispatch unit 68 may be configured to dispatch ops to reservation stations 70A-N. Dispatch unit 68 may be configured to maintain a free list of reservation station entries in reservation stations 70A-N, and may generally assign the entries to ops to balance the load between reservation stations 70A-N.

LSD predictor 66 may be configured to check for stores and loads in the ops, and may compare the PCs of any detected stores and loads to the PCs of stores and loads that previously caused ordering violations and have been allocated entries in the training table. If a PC matches for a given store, LSD predictor 66 may be configured to arm the corresponding entry in the training table. In one embodiment, LSD predictor 66 may check the strength of prediction indicator before arming the entry. If the indicator is above a threshold then the entry may be armed, and otherwise, if the indicator is below the threshold, then the entry may not be armed. Additionally, LSD predictor 66 may be configured to capture the RNUM assigned to the store as an identifier of the store.

When a load is detected that matches to the armed entry and the strength of prediction indicator for the armed entry is above the threshold, LSD predictor 66 may be configured to use the store identifier to generate a dependency for the load on the store, preventing the load from being issued by reservation station 70 until after the store is issued. In one embodiment, LSD predictor 66 may be configured to forward the store RNUM to a given reservation station 70 along with an indicator that the load has a dependency. Additionally, if there are multiple matches for the load, then LSD predictor 66 may forward a multimatch indicator to the given reservation station 70. In other embodiments, LSD predictor 66 may be configured to forward multiple store RNUMs in the multimatch case to reservation station 70, and reservation station 70 may be configured to store more than one store RNUM per load. Other embodiments may indicate the load-store dependencies in other fashions.

Reservation stations 70A-N are representative of any number of reservation stations which may be utilized as part of a load/store unit (not shown) and/or execution units (not shown). Each reservation station 70A-N may be configured to store operations until the operations are executed by a corresponding functional unit. An example of an entry within reservation station 70A in accordance with one embodiment is shown in FIG. 3. Each of reservation stations 70A-N may include various numbers of entries, depending on the embodiment. Each entry may include a dependency indicator, a multimatch indicator, a store RNUM of a dependency, a load/store (L/S) indicator to indicate if the operation is a load or store, and a PC of an operation. In other embodiments, the entry may include other fields (e.g., source register, destination register, source operands) and/or omit one or more of the fields shown in FIG. 3. Furthermore, other types of entries (e.g., integer, floating point) may be formatted differently.

LSD predictor 66 may be configured to identify load-store pairs that cause ordering violations based on the redirect indication. The redirect indication may include the load and the store PCs or other load and store identifiers. LSD predictor 66 may thus be trained by stores and loads which cause ordering violations, to prevent such events in the future when the same code sequence is refetched and reexecuted in the processor.

Register mapper 62 may include a memory with an entry for each logical register. The entry for each logical register in the register mapper 62 may store the RNUM of the most recent op to update the logical register. Additional status may be stored in the rename map entries as well. For example, a bit may indicate whether or not the most recent op has been executed. In such an embodiment, register mapper 62 may receive signals from a given reservation station 70 identifying the ops that have been issued, which may allow register mapper 62 to update the bit. A bit indicating whether or not the most recent op has been retired may also be included.

It is noted that not all of the connections to the units shown in FIG. 3 are illustrated, and the map/dispatch unit 60 may include additional circuitry implementing other operations, not shown. For example, register mapper 62 and ROB 64 may receive the redirect indications to adjust their mappings to account for the ops being flushed. Additionally, register mapper 62 and ROB 64 may receive an indication of retiring ops to adjust their state to the retirement (e.g., freeing entries for assignment to new ops, updating the architected rename state, etc.). These operations are ancillary to the operation of LSD predictor 66, and thus are not described in more detail herein.

It is noted that, while PCs and RNUMs are used as identifiers for the stores and PCs are used as identifiers for the loads, other embodiments may use any identifier that may uniquely identify instructions in flight within the processor (e.g., any sort of tag or sequence number).

Turning now to FIG. 4, one embodiment of a load-store dependency predictor table is shown. Table 90 may include various numbers of entries, depending on the embodiment. Each entry may correspond to a load-store pair that has been predicted to have overlapping addresses and issue out of order. An entry may be allocated in table 90 in response to an ordering violation being detected. In the event that an ordering violation has occurred, a store queue entry may flush the processor, including the load that caused the violation, back to the fetch unit and table 90 may be trained on this violation, such that an entry for this specific load-store pair is added to table 90. Typically, the flushed store that triggered the redirect will already have issued, so when the flushed load is refetched and decoded, the entry in table 90 will not be armed, and the load may issue normally. On future executions of the store at that PC, the store will arm the corresponding entry in table 90 and prevent the load from issuing until the store has issued.

Table 90 may be configured to allow multiple simultaneous accesses and updates by multiple ops. Furthermore, while table 90 is illustrated as an integrated table, the different fields may be separate tables corresponding to separate memories, with entries of the separate tables associated with each other. For example, the load PCs may be a separate table, the store PCs may be a separate table, and a load PC entry may correspond to a store PC entry for which a specific load-store ordering violation has been detected and trained.

Each entry may include a valid indicator 92. Valid indicator 92 may indicate if the entry is a valid entry and if the entry should be used for enforcing a dependency between the load and store indicated by the entry. In one embodiment, the valid indicator 92 may be cleared at reset. Valid indicator 92 may also affect the replacement policy, such that invalid entries may be the first entries that are replaced when new entries are allocated. In some embodiments, valid indicator 92 may not be included in the entries of table 90. Instead, in these embodiments, the value of counter field 102 may be used to indicate if the entry is valid. Other embodiments may exclude counter field 102 in the table and only use the valid indicator 92.

Each entry may also include a store PC value 94 to identify the specific store operation. In some embodiments, the store PC value may be combined with architectural registers and/or hashed. When a store is dispatched, the store PCs of table 90 may be searched for the PC of the dispatched store. Table 90 may be a CAM for the store PC field, where each entry in the memory includes circuitry to make the comparison. The store PC field may also be a set of registers and comparators that are operated as a CAM. If a dispatched store matches on any entries, then these entries may have the armed bit 98 set. The RNUM of the store may also be written to the store RNUM 96 field of the entry. When a store is issued from a reservation station, then the armed bit 98 may be cleared from any entries of table 90 that were previously armed by that particular store.

When a load is dispatched, the load PC value 100 of each entry of table 90 may be searched for the PC of the dispatched load. Table 90 may be a CAM for the load PC field. If a dispatched load matches on any armed entries, then a dependency may be established and enforced for the specific load. If the load matches on an unarmed entry, then a dependency is not established because the corresponding store has either not been dispatched or has already been issued, and therefore an ordering violation should not occur. If the load matches on multiple armed entries, then the load may wait until all older stores have been issued before the load itself issues. If the load matches on a single armed entry, then the store RNUM may be written to the reservation station with the load. There may also be a dependency bit set for the load in the reservation station to indicate that the load has a valid dependency.

Each entry may also include a counter field 102. The value of counter 102 may indicate the strength of the prediction for that particular load-store pair in the entry. In one embodiment, counter 102 may be a two-bit up-down counter. In other embodiments, counter 102 may utilize other numbers of bits. Furthermore, counter 102 may be configured to saturate at its maximum and minimum values.

When a store matches on an entry, the counter value 102 may be checked before arming the entry. If the counter value 102 is below a threshold, then the entry may not be armed. If the counter value 102 is above the threshold, then the entry may be armed. In some embodiments, the entry may be armed without checking the counter value 102. When a load matches on an entry, the counter value 102 may also be checked. Only if the counter value 102 is above the threshold may the dependency be enforced. The value of the threshold may vary depending on the embodiment, and may be adjusted according to specific operating conditions.

In another embodiment, age-out counters may be utilized with the entries of table 90. Each entry may include an age-out counter, and the age-out counter may be set to some initial value when the entry is first allocated. An interval counter may also be utilized to count for a programmable interval, and when the interval counter expires, each age-out counter in table 90 may be decremented. The interval counter may then start over and count for the programmable interval. Each time the interval elapses, each age-out counter in table 90 may be decremented. Any time an entry is accessed or armed by a load-store pair, the age-out counter may be incremented by a fixed amount. If an entry in table 90 is no longer being used, then eventually its age-out counter will get to zero, at which point the entry may be replaced with a new entry.

In other embodiments, table 90 may include additional fields and/or omit one or more fields shown in FIG. 4. Furthermore, table 90 may be formatted differently in other embodiments.

Referring now to FIG. 5, one embodiment of the representation of counter values corresponding to load-store pair entries in a predictor table is shown. This assignment of counter values is depicted for a two-bit counter in table 110. In other embodiments, other numbers of bits may be utilized by the counter.

In one embodiment, a counter value of "11", or three, may represent "strongly enabled". For an entry with this counter value, a dependency for the load-store pair may be enforced. A counter value of "10", or two, may represent "weakly enabled". If an entry is "weakly enabled", then the dependency may also be enforced. A counter value of "01", or one, may represent "weakly disabled". If an entry is "weakly disabled", then the dependency may not be enforced for the corresponding load-store pair. A counter value of "00", or zero, may represent "strongly disabled". In some embodiments, "strongly disabled" may also indicate that the entry is invalid. The threshold in the embodiment shown in FIG. 5 is between two and one. In other embodiments, the threshold may be other values.

In one embodiment, when an entry first gets allocated, by default the counter for the new entry may be set to weakly enabled. When the counter is weakly disabled (counter=1), then a load-store pair that matches with the entry may not have a dependency established. Instead, the load may be issued without a dependency. In other embodiments, other sizes of counters may be utilized, and the counter values may have different representations.

Figure 6:
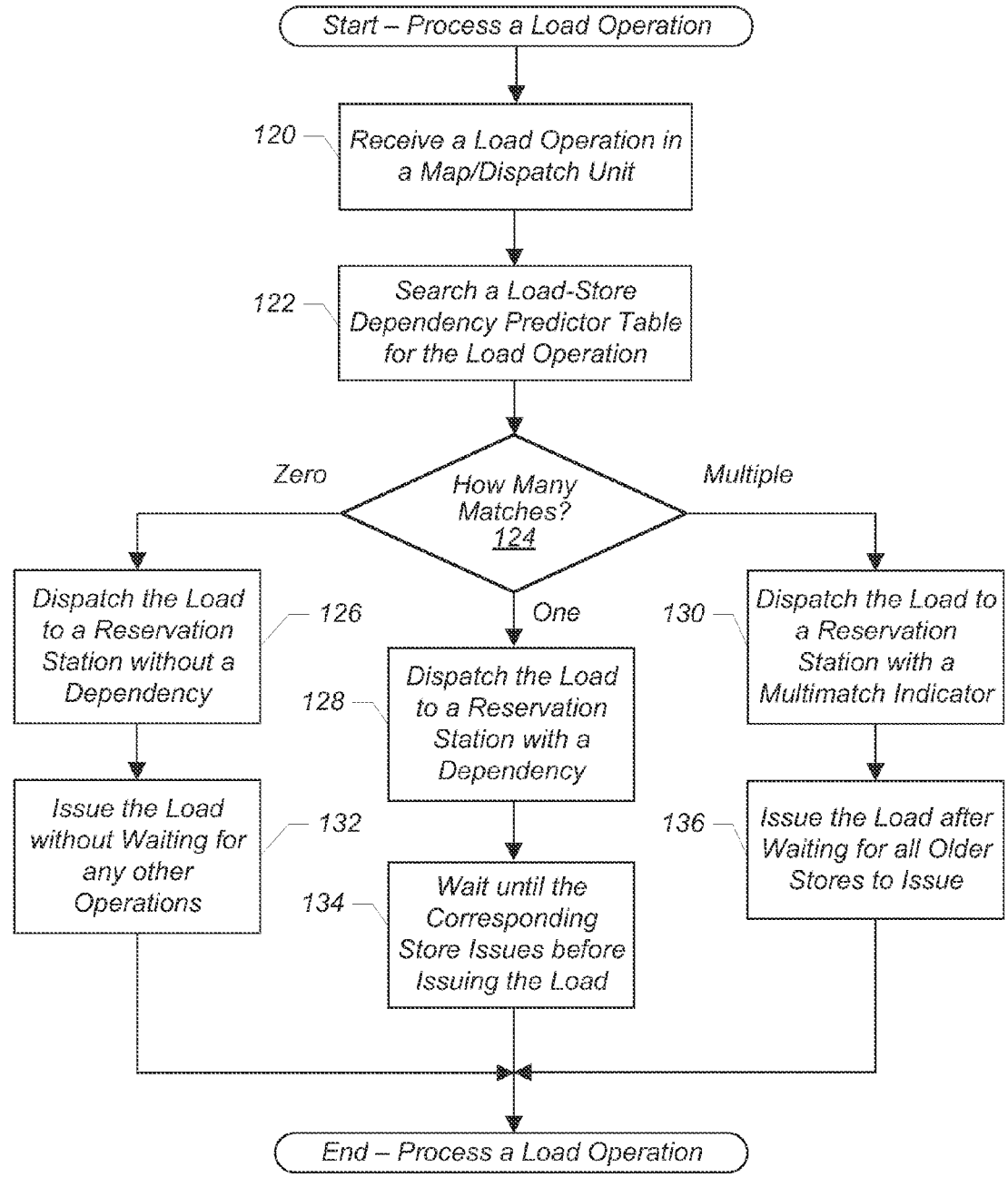
FIG. 6 is a generalized flow diagram illustrating one embodiment of a method for processing a load operation.

Turning now to FIG. 6, one embodiment of a method for processing a load operation is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Additionally, the sections of the flowchart may be performed in parallel for processing multiple load operations simultaneously.

In one embodiment, a load operation may be received by a map/dispatch unit (block 120). The load operation may have been decoded in a prior stage of a processor pipeline. Then, a load-store dependency predictor table may be searched for entries with the same PC as the load operation (block 122). After performing the search, it may be determined how many matches are found (conditional block 124). If no matches are found (conditional block 124), then the load may be dispatched to a reservation station without a dependency (block 126). The load may match on entries that are not armed, but these unarmed matches do not constitute actual matches that will require a dependency to be enforced. Similarly, if the load matches on an armed entry but the prediction indicator counter is below a threshold, then this does not constitute an actual match, and therefore, a dependency will not be enforced. In some embodiments, the counter may not need to be compared against the threshold for a load if the store already checked the counter prior to arming the entry.

If the load does not have a dependency that needs to be enforced, then this may be indicated in a variety of ways. For example, in one embodiment, a dependency bit may be cleared to indicate the load does not have a dependency. After block 126, the picker may select the load for issue from the reservation station at any time without waiting for any other operations to issue (block 132).

If a single match with an armed entry is found, then the load may be dispatched to a reservation station with a dependency (block 128). The RNUM of the corresponding store may be written to the reservation station entry with the load. In one embodiment, for an entry to be considered a match, the counter field of the entry may need to be above a threshold. For example, if the load matches on an armed entry, but the counter field of the entry is below a threshold (i.e., weakly or strongly disabled), then this may not constitute a real match. After block 128, the load may wait to issue until the corresponding store upon which it is dependent issues (block 134).

If multiple matches with armed entries are found for the load (conditional block 124), then the load may be dispatched to a reservation station with a multimatch indicator set (block 130). Then, the load may wait to issue from the reservation station until all older stores have issued (block 136). The load/store unit may include multiple reservation stations, and each reservation station may be configured to track the oldest store among its entries. When the load with multiple matches is dispatched, the oldest store in each reservation station may be recorded, and after the oldest store from each reservation station has issued, then the load may issue one cycle later.

Figure 7:
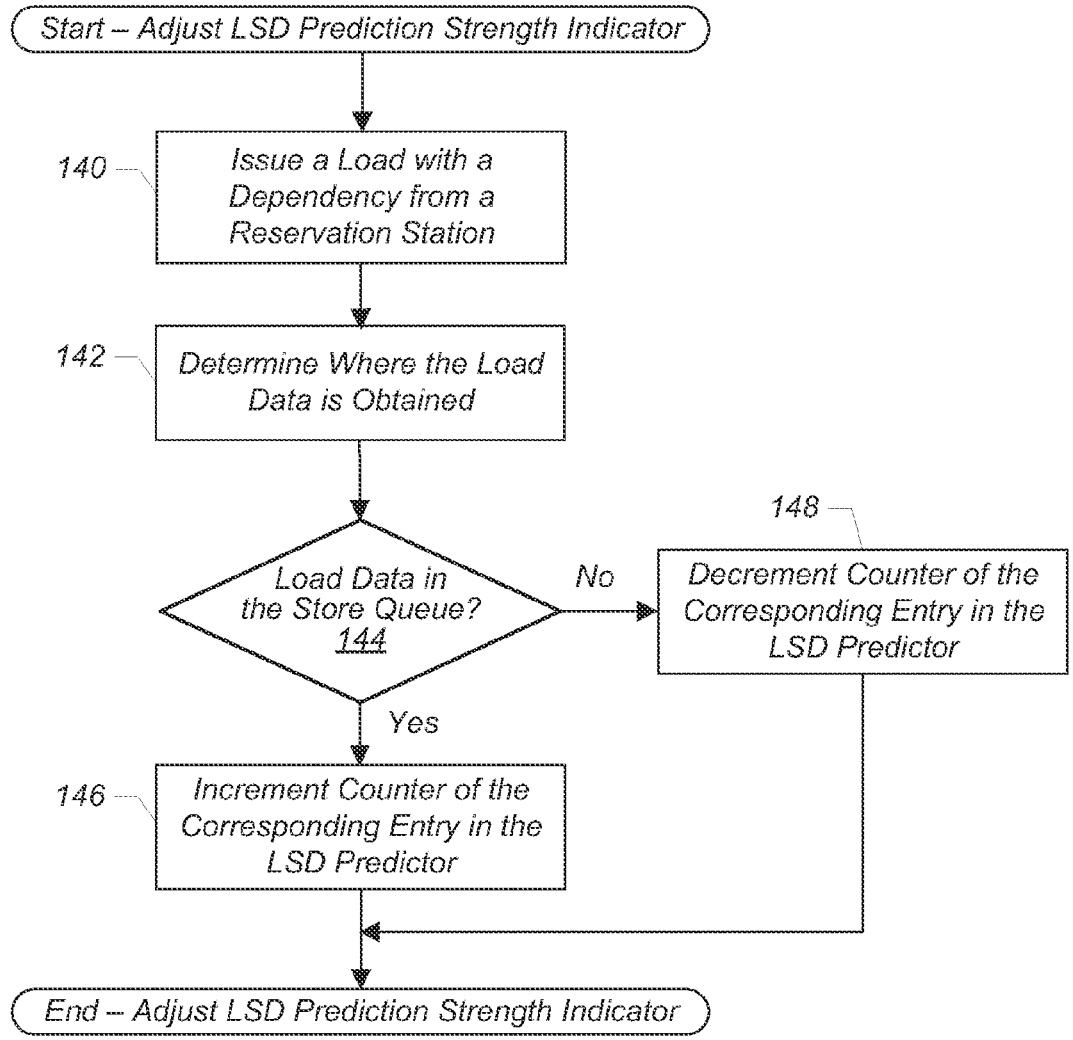
FIG. 7 is a generalized flow diagram illustrating one embodiment of a method for adjusting a load-store dependency prediction strength indicator.

Turning now to FIG. 7, one embodiment of a method for adjusting a load-store dependency prediction strength indicator is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A load with a dependency may issue from a reservation station (block 140). The load may have been delayed from issuing until after the corresponding store from the load-store pair issued. The corresponding store may have issued from the same reservation station or from a different reservation station. After the load is issued from the reservation station and executed, it may be determined from where the load data is obtained (block 142).

If the load data was in the store queue (conditional block 144), then the dependency prediction for this particular load-store pair may be considered good, and the counter of the corresponding entry in the load-store dependency predictor may be incremented (block 146). If there is a miss in the store queue for the load data (conditional block 144), then a dependency on the store may not have been warranted for the load (i.e., the dependency prediction is no longer valid), and the counter of the corresponding entry in the load-store dependency predictor may be decremented (block 148). This method may be performed in parallel for a plurality of different loads with dependencies.

Figure 8:
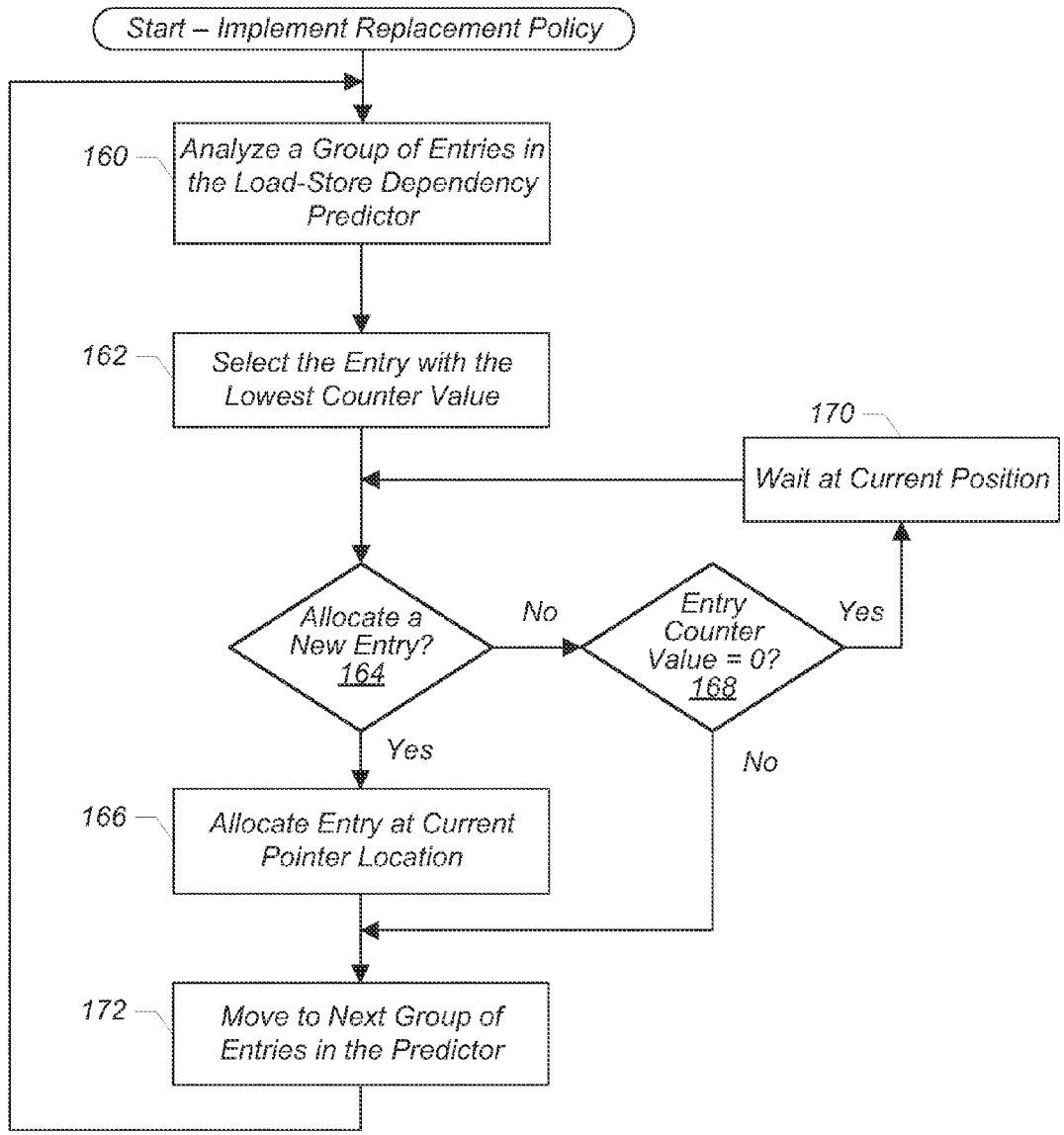
FIG. 8 is a generalized flow diagram illustrating one embodiment of a method for replacing entries in a load-store dependency predictor table.

Turning now to FIG. 8, one embodiment of a method for replacing entries in a load-store dependency predictor table is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A pointer may point to a group of adjacent entries in the load-store dependency predictor table, and the counter values of the group of adjacent entries may be analyzed (block 160). In one embodiment, the group may include four entries. In other embodiments, the group may include other numbers of entries. Then, the entry with the lowest counter value may be selected (block 162). If more than one entry has the lowest counter value, then the pointer may randomly select any of these entries, or the pointer may differentiate between these lowest-counter-value entries using some other value or metric.

If a new entry needs to be allocated at this point for a newly trained load-store pair with a dependency (conditional block 164), then the selected entry with the lowest counter value among the group may be discarded and the new entry may be allocated in its place (block 166). It is noted that a new load-store pair may be allocated in response to a redirect and flush being signaled, and that the redirect may occur at any point. Therefore, conditional block 164 could be located at other locations within the flowchart of FIG. 8. After the new entry is allocated, the pointer may move to the next group of entries (block 172). If a new entry does not need to be allocated at this time (conditional block 164), then it may be determined if the lowest counter value is zero (conditional block 168).

If the lowest counter value is zero (conditional block 168), then the pointer may stay in its current position and wait for an entry to be allocated (block 170). If the lowest counter value is not zero (conditional block 168), then the pointer may move to the next group of entries in the predictor (block 172). In one embodiment, the pointer may wait to move to the next group of entries until a load or store accesses the load-store dependency predictor. In another embodiment, the pointer may move to the next group of entries on the next clock cycle. After block 172, the method may return to block 160 to analyze the entries in the group. The method illustrated in FIG. 8 is one possible implementation of a replacement policy, and in other embodiments, other replacement policies (e.g., least recently used) may be utilized.

Figure 9:
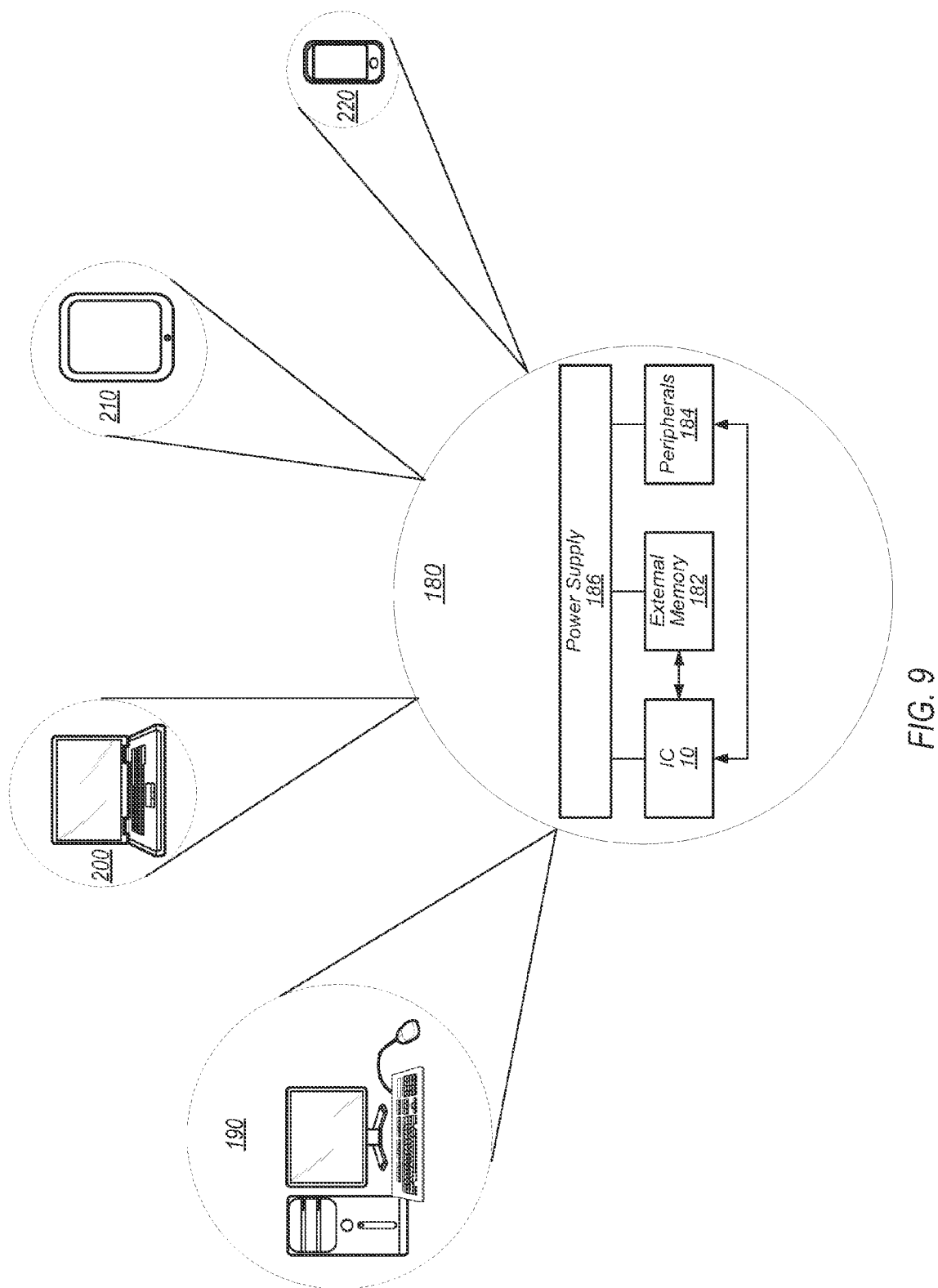
FIG. 9 is a block diagram of one embodiment of a system.

Referring next to FIG. 9, a block diagram of one embodiment of a system 180 is shown. As shown, system 180 may represent chip, circuitry, components, etc., of a desktop computer 190, laptop computer 200, tablet computer 210, cell phone 220, or otherwise. In the illustrated embodiment, the system 180 includes at least one instance of IC 10 (of FIG. 1) coupled to an external memory 182.

IC 10 is coupled to one or more peripherals 184 and the external memory 182. A power supply 186 is also provided which supplies the supply voltages to IC 10 as well as one or more supply voltages to the memory 182 and/or the peripherals 184. In various embodiments, power supply 186 may represent a battery (e.g., a rechargeable battery in a smart phone, laptop or tablet computer). In some embodiments, more than one instance of IC 10 may be included (and more than one external memory 182 may be included as well).

The memory 182 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 88 in a chip-on-chip configuration, a package-on-package configuration, or a multi-chip module configuration.

The peripherals 184 may include any desired circuitry, depending on the type of system 180. For example, in one embodiment, peripherals 184 may include devices for various types of wireless communication, such as wifi, Bluetooth, cellular, global positioning system, etc. The peripherals 184 may also include additional storage, including RAM storage, solid state storage, or disk storage. The peripherals 184 may include user interface devices such as a display screen, including touch display screens or multitouch display screens, keyboard or other input devices, microphones, speakers, etc.

Figure 10:
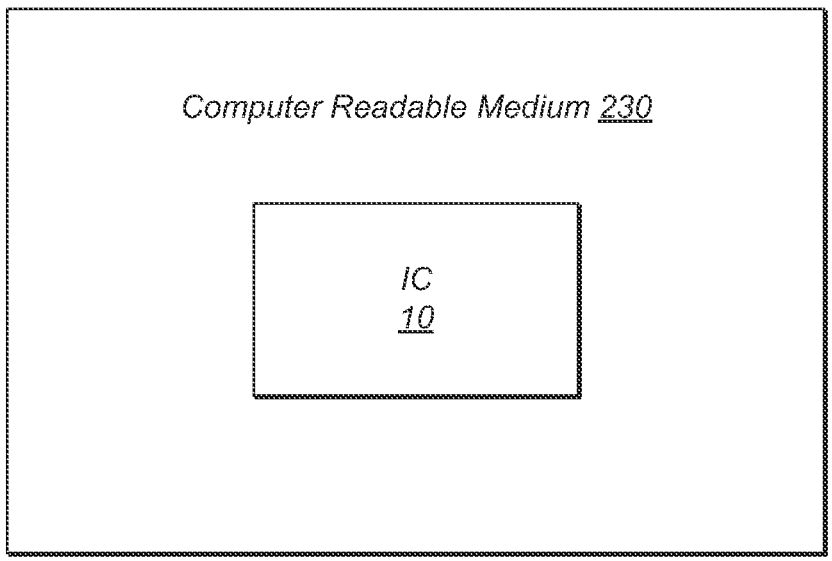
FIG. 10 is a block diagram of one embodiment of a computer readable medium.

Turning now to FIG. 10, one embodiment of a block diagram of a computer readable medium 230 including one or more data structures representative of the circuitry included in IC 10 (of FIG. 1) is shown. Generally speaking, computer readable medium 230 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 230 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 230 may be the netlist(s) (with or without the synthesis library) or the data set(s), as desired. In yet another alternative, the data structures may comprise the output of a schematic program, or netlist(s) or data set(s) derived therefrom.

While computer readable medium 230 includes a representation of IC 10, other embodiments may include a representation of any portion or combination of portions of IC 10 (e.g., LSD predictor 37, LSU 46).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   a reorder buffer;
   one or more reservation stations;
   a load-store dependency predictor coupled to the one or more reservation stations, the load-store dependency predictor comprising:
      a table with entries, wherein each entry comprises:
         a load identifier, a store identifier, a reorder buffer entry number, a strength of prediction indicator, and an armed bit used to indicate that a store operation having an identifier matching a store identifier of the respective entry has been dispatched;
   and
   circuitry configured to:
      set an armed bit for an entry in the table, responsive to detecting dispatch of a store operation having an identifier that matches a store identifier stored in that entry of the table;
      in response to detecting that a given load operation has an identifier that matches a load identifier of a given entry that has an armed bit that is set:
         predict the given load operation is dependent on a given store operation having an identifier that matches a store identifier of the given entry;
         increment a strength of prediction indicator of the given entry responsive to determining data for the given load operation is retrieved from a first location, the first location comprising a store queue; and
         decrement the strength of prediction indicator of the given entry responsive to determining the data for the given load operation is retrieved from a second location that is different from the first location, wherein the second location is a cache.

2. The processor as recited in claim 1, wherein the strength of prediction indicator of each entry of the table comprises a strength of prediction counter.

3. The processor as recited in claim 2, wherein the circuitry of the load-store dependency predictor is further configured to:
   set the armed bit of the given entry, responsive to detecting the given store operation has an identifier that matches the store identifier of the given entry and determining a strength of prediction counter of the given entry is above a threshold; and
   store a reorder buffer entry number of the given store operation in the given entry.

4. The processor as recited in claim 3, wherein a reservation station of the one or more reservation stations stores the given load operation with an identification of the reorder buffer entry number of the given entry.

5. The processor as recited in claim 4, wherein responsive to issuance of the given store operation:
the reorder buffer number of the given store operation is broadcast;
the broadcast reorder buffer number is detected by the reservation station storing the given load operation; and
the given load operation is permitted to issue responsive to detecting the broadcast reorder buffer number of the given store operation matches the identification of the reorder buffer entry number stored with the given load operation.

6. The processor as recited in claim 2, wherein each entry of the table further comprises an age-out counter that is decremented responsive to expiration of a programmable period of time.

7. The processor as recited in claim 1, wherein responsive to detecting issuance of a given store operation from a reservation station, the circuitry is configured to clear an armed bit in the table that was previously set responsive to dispatch of the given store operation.

8. A method comprising:
maintaining a table with entries, wherein each entry comprises:
a load identifier, a store identifier, a reorder buffer entry number, a strength of prediction indicator and an armed bit used to indicate that a store operation having an identifier matching a store identifier of the respective entry has been dispatched;
setting an armed bit for an entry in the table, responsive to detecting dispatch of a store operation having an identifier that matches a store identifier stored in that entry of the table;
in response to detecting that a given load operation has an identifier that matches a load identifier of a given entry that has an armed bit that is set, predicting the given load operation is dependent on a given store operation having an identifier that matches a store identifier of the given entry;
incrementing a strength of prediction indicator of the given entry responsive to determining data for the given load operation is retrieved from a first location, the first location comprising a store queue; and
decrementing the strength of prediction indicator of the given entry responsive to determining the data for the given load operation is retrieved from a second location that is different from the first location, wherein the second location is a cache.

9. The method as recited in claim 8, further comprising:
dispatching the given load operation that has a particular identifier;
searching the table for a load identifier that matches the particular identifier; and
responsive to finding a single entry that has a load identifier that matches the particular identifier and an armed bit that is set, establishing a dependency between the given load operation and a store operation corresponding to a reorder buffer entry number of the single entry.

10. The method as recited in claim 9, further comprising:
storing the given load operation in a reservation station with an identification of the reorder buffer entry number of the single entry;
broadcasting the reorder buffer entry number of the single entry responsive to issuance of the store operation corresponding to the reorder buffer entry number of the single entry; and
permitting the given load operation to issue from the reservation station responsive to detecting the broadcast reorder buffer number entry.

11. The method as recited in claim 8, further comprising:
dispatching the given load operation that has a particular identifier;
searching the table for a load identifier that matches the particular identifier; and
responsive to finding multiple matching entries, each matching entry having a load identifier that matches the particular identifier and an armed bit that is set, establishing a dependency between the given load operation and multiple store operations.

12. The method as recited in claim 11, further comprising
identifying an oldest store operation in each reservation station of a plurality of reservation stations responsive to establishing the dependency; and
permitting the given load operation to issue from a reservation station of the plurality of reservation stations responsive to issuance of all identified oldest store operations from respective reservation stations of the plurality of reservation stations.

13. The method as recited in claim 11, further comprising permitting the given load operation to issue from a reservation station responsive to issuance of all store operations older than the given load operation.

14. The method as recited in claim 8, wherein each entry of the table comprises an age-out counter that is decremented responsive to expiration of a programmable period of time.

* * * * *